(12) United States Patent
Jeong et al.

(10) Patent No.: US 9,758,006 B2
(45) Date of Patent: Sep. 12, 2017

(54) DRIVING UNIT AND ROBOT CLEANER HAVING THE SAME

(71) Applicant: SAMSUNG ELECTRONICS CO., LTD., Suwon-si, Gyeonggi-do (KR)

(72) Inventors: Kyung Han Jeong, Suwon (KR); Byoung In Lee, Suwon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/097,737

(22) Filed: Apr. 13, 2016

(65) Prior Publication Data

US 2016/0297276 A1    Oct. 13, 2016

(30) Foreign Application Priority Data

Apr. 13, 2015    (KR) .................. 10-2015-0051577

(51) Int. Cl.
*B60G 17/0195*    (2006.01)
*A47L 9/00*    (2006.01)
(Continued)

(52) U.S. Cl.
CPC .......... *B60G 17/0195* (2013.01); *A47L 9/009* (2013.01); *A47L 9/1683* (2013.01);
(Continued)

(58) Field of Classification Search
CPC ... B60G 17/0195; A47L 9/1683; A47L 9/009; A47L 2201/00; A47L 2201/04; B60K 7/0007

See application file for complete search history.

(56) References Cited

U.S. PATENT DOCUMENTS

| 7,213,663 B2 * | 5/2007 | Kim .................. A47L 9/009 180/251 |
| 2005/0027396 A1 * | 2/2005 | Yang .................. B60G 17/0157 700/245 |

(Continued)

FOREIGN PATENT DOCUMENTS

| EP | 2 570 064 A1 | 3/2013 |
| EP | 2 679 130 A1 | 1/2014 |

(Continued)

OTHER PUBLICATIONS

Extended European Search Report dated Aug. 12, 2016 in corresponding European Patent Application No. 16164970.2.

(Continued)

*Primary Examiner* — Darlene P Condra
(74) *Attorney, Agent, or Firm* — Staas & Halsey LLP

(57) ABSTRACT

Disclosed herein are a driving unit and a robot cleaner having the same. The robot cleaner has a configuration in which an elastic member is supported so that an angle formed between the elastic member and a rotation shaft of the driving unit is provided in a predetermined range to offset a decrease in an elastic force generated while the robot cleaner is driving on a surface having steps and a driving wheel protrudes downward from the robot cleaner. Accordingly, there is the effect where a traction force is maintained at a predetermined level for maintaining the driving performance of the robot cleaner even while the robot cleaner is driving and the driving wheel is lowered to decrease the elastic force of the elastic member.

21 Claims, 16 Drawing Sheets

(51) Int. Cl.
*A47L 9/16* (2006.01)
*B60K 7/00* (2006.01)

(52) U.S. Cl.
CPC ......... *B60K 7/0007* (2013.01); *A47L 2201/00* (2013.01); *A47L 2201/04* (2013.01)

(56) References Cited

U.S. PATENT DOCUMENTS

| | | |
|---|---|---|
| 2008/0307590 A1 | 12/2008 | Jones et al. |
| 2013/0056290 A1* | 3/2013 | Lee ................ A47L 9/009 180/65.6 |
| 2014/0259475 A1* | 9/2014 | Doughty ............ A47L 9/0477 15/52.1 |
| 2016/0015232 A1* | 1/2016 | Nakamura ............ A47L 9/009 15/340.1 |
| 2016/0166127 A1* | 6/2016 | Lewis ................ A47L 9/02 15/49.1 |

FOREIGN PATENT DOCUMENTS

| | | |
|---|---|---|
| GB | 2497452 A | 6/2016 |
| KR | 10-2013-0008891 | 1/2013 |
| KR | 10-2013-0035389 | 4/2013 |
| KR | 10-2014-0000811 | 1/2014 |

OTHER PUBLICATIONS

Communication under Rule 71(3) EPC dated Jun. 30, 2017 in related European Patent Application No. 16164970.2.

\* cited by examiner

DRIVING UNIT AND ROBOT CLEANER HAVING THE SAME

CROSS-REFERENCE TO RELATED APPLICATION

This application claims the benefit of Korean Patent Application No. 10-2015-0051577, filed on Apr. 13, 2015 in the Korean Intellectual Property Office, the disclosure of which is incorporated herein by reference.

BACKGROUND

1. Field

Embodiments of the present disclosure relate to a driving unit and a robot cleaner having the same, and more particularly, to a structure which improves a traction force of a driving unit.

2. Description of the Related Art

In general, a robot cleaner is an apparatus which automatically cleans an area to be cleaned by moving about in the area by itself and suctioning in foreign materials such as particles from a floor surface even without a user's operation.

Such a robot cleaner includes driving wheels for driving a robot cleaner body, and the driving wheels drive a robot cleaner body using a frictional force generated between the driving wheels and a floor surface being in contact therewith.

To generate the frictional force, a force which presses the driving wheels toward the surface is needed, and this is related to a traction force of the robot cleaner.

The traction force of the driving wheels has to be constantly maintained regardless of a state or a condition of the floor surface so that the robot cleaner maintains a constant driving performance on various floor conditions, such as a hard floor or carpet, and a floor where steps exist.

Although elastic members such as a tension coil spring have been conventionally used for pressing the driving wheels toward a floor surface, the elastic members have a big difference in a force which presses the driving wheels due to change in an elastic force depending on the displacement of the driving wheels.

SUMMARY

Therefore, it is an aspect of the present disclosure to provide an improved driving unit where a change in a traction force of a driving wheel is not big even when a displacement of the driving wheel changes while a robot cleaner is moving on a surface having a step and a robot cleaner having the same.

Additional aspects of the disclosure will be set forth in part in the description which follows and, in part, will be obvious from the description, or may be learned by practice of the disclosure.

In accordance with one aspect of the present disclosure, a robot cleaner includes a main body, and a driving unit including a driving wheel which drives the main body, wherein the driving unit includes a housing, a driving motor which generates a rotational force for driving the driving wheel, a driving arm which rotates about a rotation point so that the driving wheel is supported to protrude downward from the main body, and an elastic member supported between a first support point provided at one side of the driving arm and a second support point provided at the housing, wherein an angle (θ) formed at the first support point by the rotation point and the second support point is maintained at an acute angle while the driving arm is rotating.

The driving arm may rotate about the rotation point in between a first position and a second position in which the driving wheel protrudes toward the outside of the main body, and when the angle formed when the driving arm is positioned at the first position is referred to as a first angle, and the angle formed when the driving arm is positioned at the second position is referred to as a second angle, and the first angle may be less than the second angle.

The first angle may be 50° or less.

The second angle may be 90° or less.

The driving arm may include a support protrusion which extends from the driving arm to protrude toward the outside of the housing and includes the first support point.

The support protrusion may support one side of the elastic member and change a displacement of the elastic member in conjunction with the rotation of the driving arm.

The housing may include a support hook having the second support point, and the support hook may support one side of the elastic member.

The driving wheel may a traction force generated due to a frictional force with a surface when driving, and the traction force of the driving wheel may be maintained at a constant level in all cases where the driving wheel protrudes toward the outside of the main body and the driving wheel is seated inside the main body.

In accordance with another aspect of the present disclosure, a robot cleaner includes a main body, and a driving unit including a driving wheel which drives the main body, wherein the driving unit includes a driving arm which rotates about a rotation point so that the driving wheel is supported to move downward from the main body and an elastic member supported between a first support point which is provided at one side of the driving arm and moved in conjunction with the driving arm and a second support point which is fixed, wherein the second support point is always positioned above the first support point or at least the same horizontal line.

A height of a position at which the first support point is positioned may be raised while the driving wheel is moving downward from the main body.

The first support point may be positioned above the rotation point.

In accordance with still another aspect of the present disclosure, a robot cleaner includes a main body, and a driving unit including a driving wheel which drives the main body, wherein the driving unit includes a driving motor which generates a rotational force which drives the driving wheel, a driving arm which rotates about a rotation point so that the driving wheel is supported to protrude downward from the main body, and an elastic member supported between a first support point which is provided at one side of the driving arm and moves in conjunction with the driving arm and a second support point which is fixed, and with respect to a first straight line which connects the first support point to the second support point, and a second straight line forms a right angle with the first straight line at the rotation point while in contact with the first straight line, the second straight line when the driving wheel protrudes downward from the main body may have a length greater than a line when the driving wheel is seated in the main body.

The length of the second straight line may have a maximum value when the wheel rotates about the rotation point at a second position while rotating in between a first position and the second position in which the driving wheel protrudes toward the outside of the main body.

The length of the second straight line may extend while the driving wheel is protruding downward from the main body.

The driving unit may further include a housing in which the driving wheel, a driving motor, and a driving arm are seated, and the rotation point and the second support point may be provided inside the housing.

The driving arm may include a support protrusion which extends from the driving arm to protrude toward an outside of the housing and includes the first support point.

The support protrusion may support one side of the elastic member and change a displacement of the elastic member in conjunction with the rotation of the driving arm.

The housing may include a support hook having the second support point, and the support hook may support one side of the elastic member.

An angle formed around the first support point by the rotation point and the second support point may be maintained at an acute angle while the driving arm is rotating.

The driving arm may rotate about the rotation point in between a first position and a second position in which the driving arm protrudes toward an outside of the main body, and when the angle formed when the driving arm is positioned at the first position is referred to as a first angle, and the angle formed when the driving arm is positioned at the second position is referred to as a second angle, and the first angle may be less than the second angle.

A driving unit which is installed in a robot cleaner according to an aspect of the present disclosure and drives the robot cleaner may include a housing, a driving wheel which drives a main body, a driving motor which generates a rotational force which drives the driving wheel, a driving arm which rotates about a rotation point so that the driving wheel is supported to move between a first position and a second position, and an elastic member supported in between a first support point provided at one side of the driving arm and a second support point provided at the housing, wherein an angle θ formed around the first support point by the rotation point and the second support point increases while the driving arm is moving from the first position to the second position.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings.

Driving units 600 according to one embodiment of the present disclosure may be installed in a robot cleaner 1. In addition, besides the robot cleaner 1, the driving unit 600 may also be installed in other robots or moving apparatus driven by driving wheels and the like. Hereinafter, it is assumed that the driving unit 600 is installed in the robot cleaner 1, and the driving unit 600 and the robot cleaner 1 having the same will be described in detail.

Figure 1:
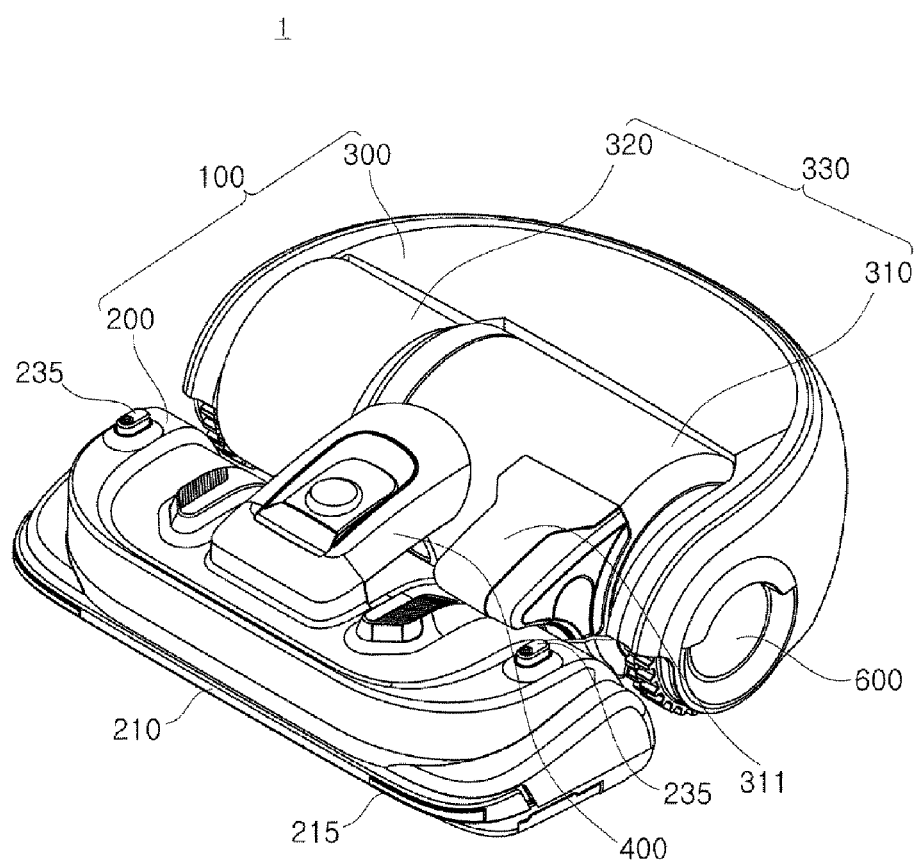
FIG. 1 is a perspective view illustrating an exterior of a robot cleaner according to one embodiment of the present disclosure.

FIG. 1 is a perspective view illustrating an exterior of a robot cleaner according to one embodiment of the present disclosure.

As illustrated in FIG. 1, the robot cleaner 1 includes a main body forming an exterior and an upper housing 100 forming at least a part of the exterior of the main body.

The upper housing 100 includes a first upper housing 200 formed in the front and a second upper housing 300 formed in the back of the first upper housing 200. A connection member 400 which connects the first upper housing 200 and the second upper housing 300 may be positioned between the first upper housing 200 and the second upper housing 300.

A dust collecting unit 330 configured to store dust may be coupled to the second upper housing 300. The dust collecting unit 330 may include a suction motor 320 which provides a driving force which suctions in dust and a dust collecting container 310 which stores the suctioned-in dust.

A grip portion 311 provided to be gripped by a user may be provided at the dust collecting container 310. The user may grip the grip portion 311, turn the dust collecting container 310, and separate the dust collecting container 310 from the second upper housing 300. The user may separate the dust collecting container 310 and remove dust accumulated in the dust collecting container 310.

A lower housing 500 provided to be coupled to the second upper housing 300 may be provided at a lower portion of the second upper housing 300. The driving unit 600 which drives the main body may be provided at the lower housing 500. The driving unit 600 may include driving wheels 610 for moving the main body and a roller 510 (see FIG. 5) rotatably provided to minimize the load of movement of the main body. According to one embodiment of present disclosure, the driving wheels 610 may be coupled to both side surfaces of the lower housing 500.

A brush unit (not shown) configured to sweep dust on a floor for collecting may be provided at the first upper housing 200. A bumper 210 for buffering noise and an impact generated when the robot cleaner 1 bumps into a wall surface during moving may be coupled to a front portion of the first upper housing 200. Also, an additional buffer member 215 may be coupled to the bumper 210.

An entry blocking sensor 235 may be protrusively provided on a top surface of the first upper housing 200. The entry blocking sensor 235 may prevent the robot cleaner 1 from entering a predetermined area by sensing infrared light. According to one embodiment of present disclosure, the entry blocking sensor 235 may be provided on both sides of the first upper housing 200.

Figure 2:
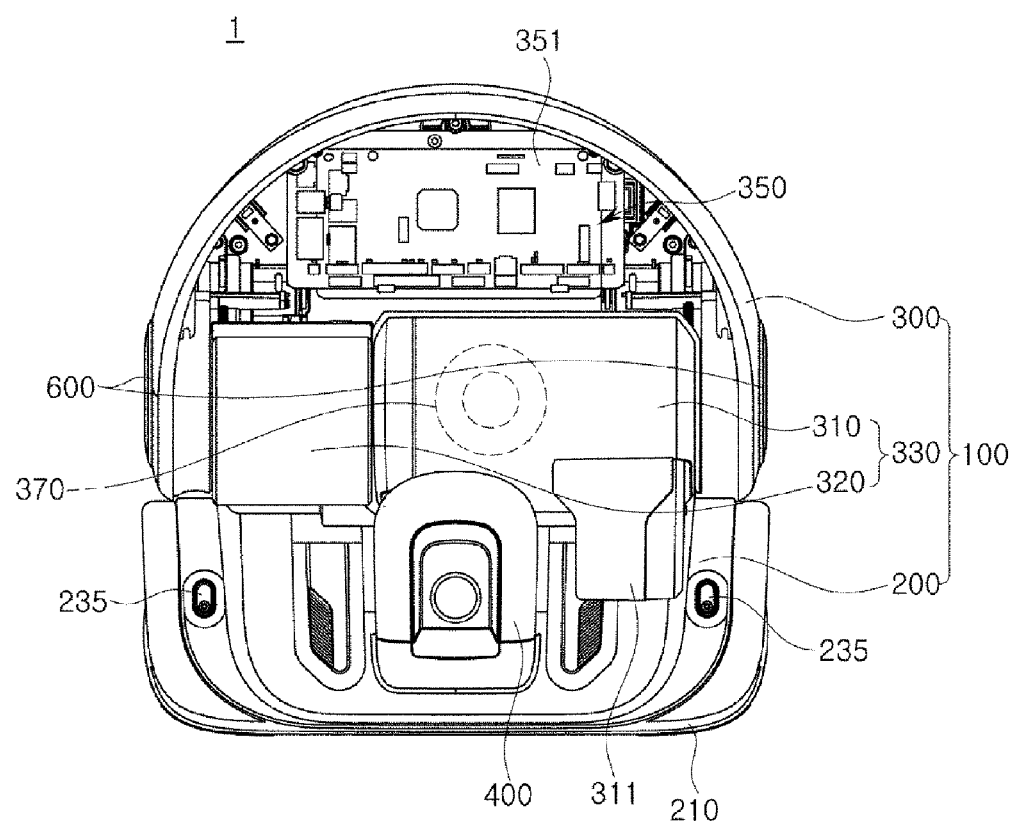
FIG. 2 is a plan view illustrating the robot cleaner according to the embodiment of the present disclosure when an external housing and a top housing of a second upper housing are removed.
Figure 3:
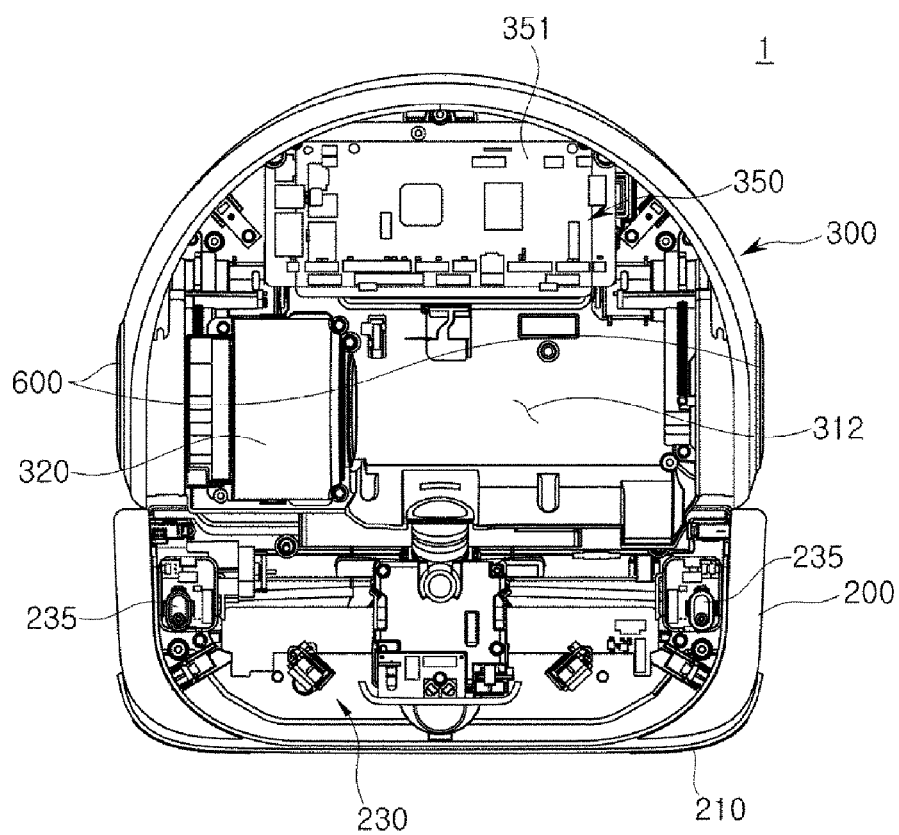
FIG. 3 is a plan view illustrating the robot cleaner according to the embodiment of the present disclosure when an external housing of a first upper housing, the external housing and so on of the second upper housing are removed.

FIG. 2 is a plan view illustrating the robot cleaner 1 according to the embodiment of the present disclosure when an external housing 301 (see FIG. 4) and a top housing 303 (see FIG. 4) of a second upper housing 300 are removed, and FIG. 3 is a plan view illustrating the robot cleaner 1 according to one embodiment of the present disclosure when a first upper housing 200 and an external housing 301, a top housing 303, a dust collecting container 310, a suction motor cover 302 (see FIG. 5), and the like of the second upper housing 300 are removed.

As illustrated in FIGS. 2 and 3, a power unit 350 which supplies power for driving the main body may be coupled to an inner side of the second upper housing 300.

The power unit 350 may include a battery (not shown), a main board 351, and a display (not shown) positioned above the main board 351 and configured to display status of the robot cleaner. The power unit 350 may be disposed to be positioned behind the dust collecting unit 330.

The battery is provided with a rechargeable secondary battery, and recharged by receiving power from a docking station (not shown) when the main body finishes a cleaning process and is coupled to the docking station.

The suction motor 320 may be positioned inside a suction motor cover 302 (see FIG. 5). The suction motor 320 may be coupled to a side surface of the dust collecting container 310. According to one embodiment of present disclosure, the driving wheel 610 may be disposed at each side surface of the dust collecting container 310 and the suction motor 320.

Accordingly, the dust collecting container 310, the suction motor 320, and the driving wheel 610 may be disposed along a lateral direction of the main body. That is, the dust collecting container 310, the suction motor 320, and the driving wheel 610 may be disposed in an almost straight line shape.

According to one embodiment of present disclosure, at least a part of the dust collecting container 310 may be coupled to be exposed to the exterior. That is, an additional housing is not coupled to the top surface of the dust collecting container 310. Accordingly, a user may check the amount of dust in the dust collecting container 310 with naked eyes.

A cyclone 370 may be installed in the dust collecting container 310. As illustrated in FIG. 2, the cyclone 370 may be disposed in the dust collecting container 310 adjacent to the suction motor 320. In addition, the second upper housing 300 may include a container installation portion 312 in which the dust collecting container 310 is installed.

An obstacle detecting sensor 230 may be provided in the first upper housing 200.

A front portion of the first upper housing 200 may be provided in a rectangular shape to suction in dust by being pressed forward and sideward in the moving direction. Accordingly, it is possible to suction in dust by being maximally pressed against a wall surface. Accordingly, the robot cleaner 1 according to the embodiment of the present disclosure may efficiently suction in dust on a wall surface even without an additional side brush.

Figure 4:
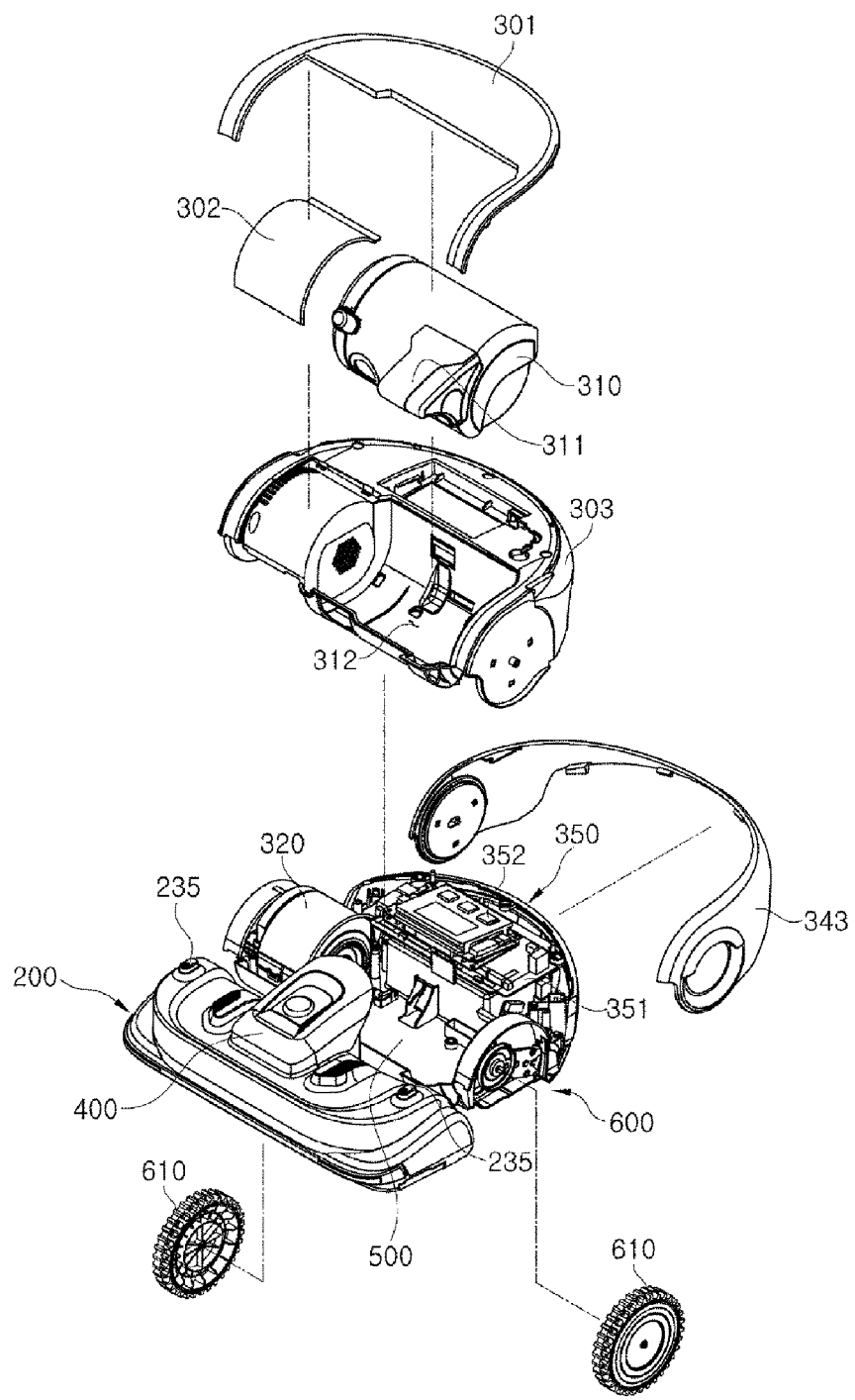
FIG. 4 is an exploded perspective view illustrating a part of the configuration of the robot cleaner according to the embodiment of the present disclosure.

FIG. 4 is an exploded view illustrating components of the second upper housing 300 of the robot cleaner 1 according to one embodiment of the present disclosure.

The second upper housing 300 may include a top housing 303 coupled to an upper portion of the robot cleaner 1 and a rear housing 343 covering from a rear side of the second upper housing 300 to the driving wheel 610.

In the case of the top housing 303, an area corresponding to the display 352 may be provided to be open so that a status displayed on the display 352 may be projected therethrough. The dust collecting container 310 may be coupled to the top housing 303. A separate external housing 301 coupled to an upper portion of the power unit 350 may be coupled to an outer side of the top housing 303. The external housing 301 may be provided so that a status of the display 352 may be projected therethrough.

In addition, the suction motor cover 302 may be coupled to an upper portion of the suction motor 320. The suction motor 320 may be coupled to the second upper housing 300, the top housing 303 may be inserted into the second upper housing 300, and the suction motor cover 302 may be coupled to the top housing 303. According to one embodiment of present disclosure, since the external housing 301 does not surround a region in which the suction motor 320 is positioned, the suction motor cover 302 is assembled for preventing foreign materials from being inserted into the suction motor 320.

After the first driving wheel 341 and the second driving wheel 342 are coupled to both sides of the second upper housing 300, the rear housing 343 may be assembled to surround each of the driving wheels 341 and 342.

As described above, the robot cleaner 1 according to the embodiment of present disclosure may efficiently use space by efficiently arranging components thereof. Accordingly, a size of the dust collecting container 310 may be increased.

Figure 5A:
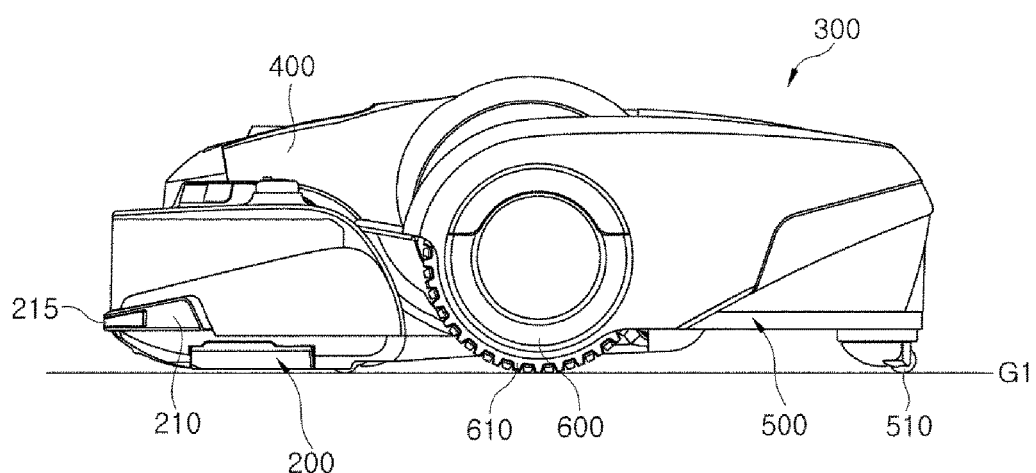
FIG. 5A is a view illustrating a side surface of the robot cleaner according to the embodiment of the present disclosure.

FIG. 5A is a view illustrating a side surface of the robot cleaner 1 according to the embodiment of the present disclosure.

As illustrated in FIG. 5A, a height between a floor surface G1 and the first upper housing 200 may be different from a height between the floor surface G1 and the second upper housing 300. According to one embodiment of present disclosure, the height between the floor surface and the first upper housing 200 may be less than the height between the floor surface and the second upper housing 300. Since the height of the first upper housing 200 is less than the height of the second upper housing 300, there is an effect where the robot cleaner 1 appears to have a relatively small size as sizes of the dust collecting container 310 and the power unit 350 positioned in the second upper housing 300 are increased. Accordingly, an amount of dust stored in the miniaturized robot cleaner 1 may be increased and driving time may be increased without additional recharging.

In addition, since the height of the first upper housing 200 is relatively low, obstacles positioned on a floor surface may be efficiently detected, and a blind spot in which the obstacle detecting sensor 230 cannot detect may be prevented from occurring.

According to one embodiment of present disclosure, although the connection member 400 is assembled between the first upper housing 200 and the second upper housing, it is not limited thereto, and the first upper housing 200 and the second upper housing may also be integrally injection molded without a separate border therebetween. In this case, the first upper housing 200 and the second upper housing 300 may be formed in an approximately streamlined shape.

Figure 5B:
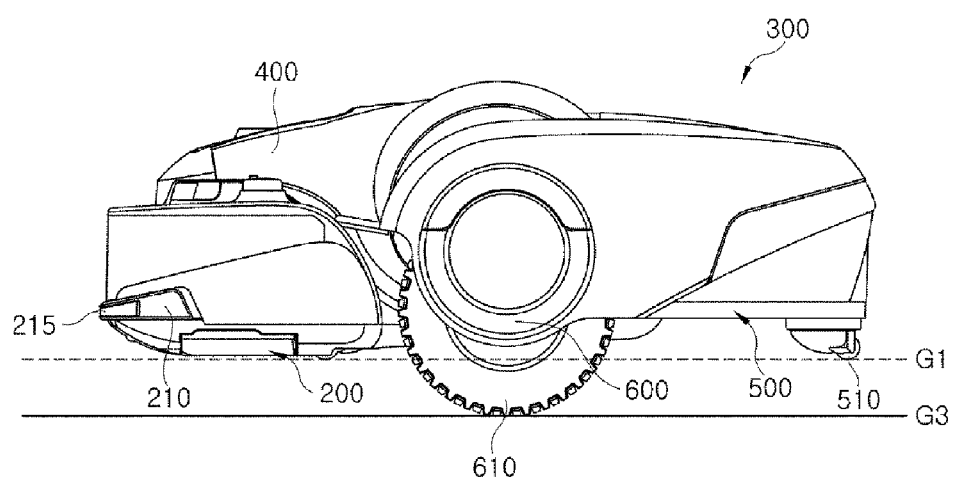
FIG. 5B is a view illustrating the side surface of the robot cleaner when a driving wheel of the robot cleaner according to the embodiment of the present disclosure protrudes downward.

FIG. 5B is a view illustrating the side surface of the robot cleaner 1 when a driving wheel 610 of the robot cleaner according to the embodiment of the present disclosure protrudes downward.

There are cases in which the robot cleaner 1 passes over steps while the robot cleaner 1 is moving on a floor surface. For example, this corresponds to a case in which the robot cleaner 1 climbs a slope having a constant incline with respect to a surface or passes over a concave surface having a downward depth from a surface.

In the case of a step on a surface, since a lifting phenomenon in which the driving wheel 610 is separated from the surface occurs, a frictional force with the floor surface may not be generated, and driving may be impossible. Accordingly, the driving wheel 610 may be provided to protrude downward from the robot cleaner 1 so as to maintain a state in which the driving wheel 610 is in contact with a surface while the robot cleaner 1 is driving.

As illustrated in FIG. 5B, even when a driving surface is lowered from a general driving surface G1 to a level G3, the robot cleaner 1 may be continuously driven by being in contact with the surface since the driving wheel 610 protrudes downward.

However, even with the driving wheel 610 protruded, the constant driving performance may be maintained only when a traction force due to the driving wheel 610 being pressed against the surface is maintained as much as when the driving wheel 610 is positioned at a normal position. Hereinafter, a traction force of the robot cleaner 1 will be described in detail with a configuration of the driving unit 600.

Hereinafter, the driving unit 600 on the right side based on a direction in which the robot cleaner 1 drives will be described as an example, and unless the context particularly indicates otherwise, the same description will also apply to the driving unit 600 on the left side based on the direction in which the robot cleaner 1 drives.

Figure 6:
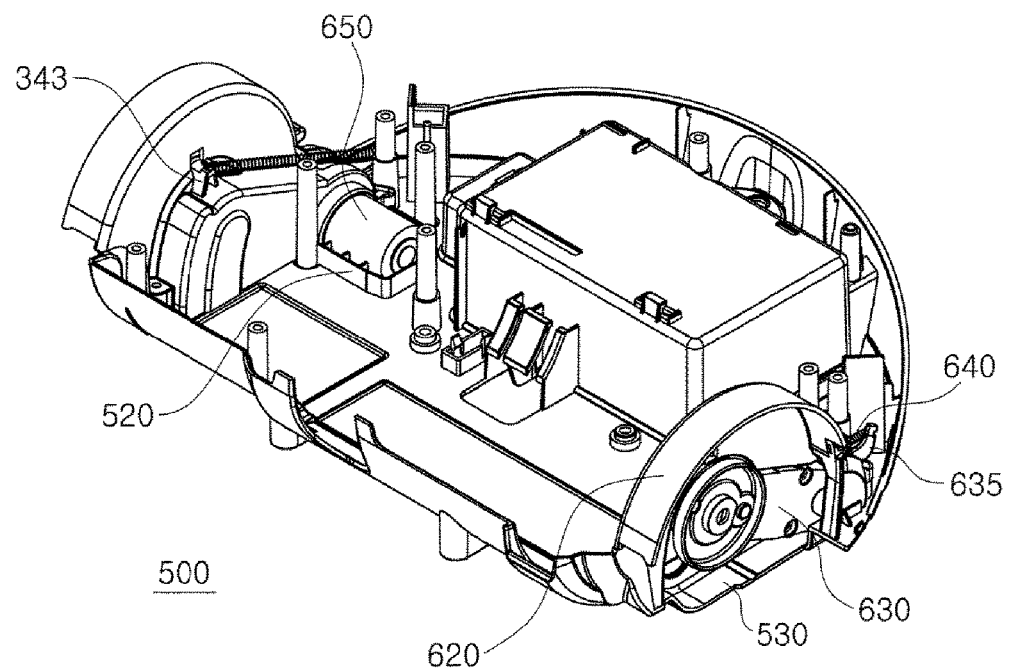
FIG. 6 is a perspective view illustrating a lower housing of the robot cleaner according to the embodiment of the present disclosure.
Figure 7:
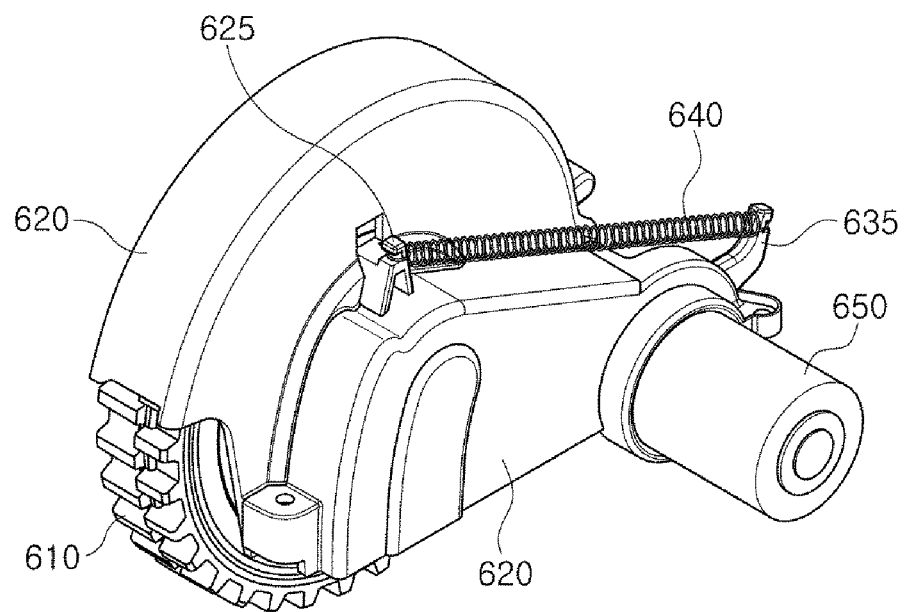
FIG. 7 is a perspective view illustrating a driving unit according to one embodiment of the present disclosure.
Figure 8:
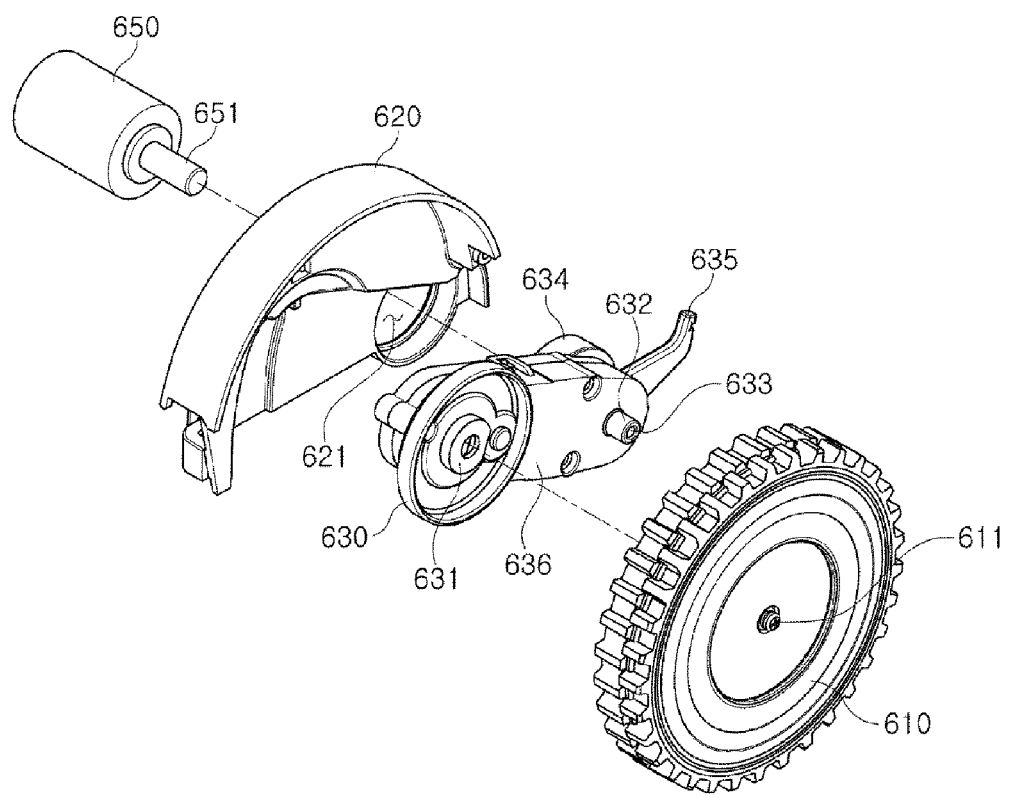
FIG. 8 is an exploded perspective view illustrating a part of the configuration of the driving unit according to the embodiment of the present disclosure.

FIG. 6 is a perspective view illustrating a lower housing of the robot cleaner according to the embodiment of the present disclosure, FIG. 7 is a perspective view illustrating the driving unit according to one embodiment of the present disclosure seen from a direction opposite that of FIG. 6, and FIG. 8 is an exploded perspective view illustrating a part of the configuration of the driving unit according to the embodiment of the present disclosure.

As illustrated in FIG. 6, the driving units 600 may be provided in the lower housing 500. Specifically, the driving units 600 may be provided at both sides of the lower housing 500.

The lower housing 500 may be provided with a seating portion (not shown) on which the driving unit 600 is seated and a driving motor seating portion 520 on which the driving motor 650 is seated.

The driving unit 600 may be provided to be detachable from the lower housing 500 for easy separation therefrom when a problem in driving occurs while the robot cleaner 1 is driving. Particularly, the driving motor 650 may be easily separated from the driving motor seating portion 520.

As illustrated in FIGS. 7 and 8, the driving unit 600 may include the driving wheel 610, a housing 620 which covers a configuration of the driving unit 600, such as the driving wheel 610, a driving motor 650 which generates a driving force, a driving arm 630 which supports the driving motor 650 so that the driving motor 650 protrudes downward from the robot cleaner 1, and an elastic member 640 which transfers an elastic force to the driving wheel 610 and generates a traction force of the robot cleaner 1.

Since the driving shaft 611 of the driving wheel 610 is assembled into a driving wheel assembly groove 631 of the driving arm 630, the driving wheel 610 may be rotatably supported by the driving arm 630.

The driving arm 630 may be provided to be rotatable about a rotation shaft 633 positioned at the center of a rotation protrusion 632. As a driving motor assembly portion 634 is provided at one side of the driving arm 630, one side of the driving motor 650 may be inserted into the driving arm 630.

The driving motor assembly portion 634 may be provided in a ring type cylindrical shape to protrusively extend from one side of the driving arm 630.

An external circumferential surface of the driving motor assembly portion 634 may be rotatably supported by a driving arm seating portion 621 which is cut from the housing 620 in a circular shape.

A driving shaft 651 which transfers a rotational force generated from the driving motor 650 may be positioned inside the driving arm 630 through the driving motor assembly portion 634 to transfer the rotational force to a gear portion (not shown) provided inside the driving arm 630.

The gear portion may transfer the rotational force which has been transferred through the driving shaft 651 to the driving wheel assembly groove 631 to rotate the driving wheel 610.

The driving motor 650 may not be directly inserted into the driving arm 630, and only the driving shaft 651 may be inserted into the driving arm 630, unlike the embodiment of the present disclosure.

The rotation protrusion 632 may be provided to extend from the other side of the driving arm 630 in a cylindrical shape. The rotation protrusion 632 may be inserted into an auxiliary housing (not shown) provided at a side from which the rotation protrusion 632 protrudes, to be rotatably supported.

The rotation protrusion 632 may be provided to correspond to a central shaft of the driving motor assembly portion 634. Specifically, the rotation protrusion 632 may be provided to correspond to an axis direction of the driving shaft 651 which may be regarded as the rotation shaft of the rotation protrusion 632 and the driving motor 650.

Accordingly, the central shaft of the driving motor assembly portion 634 and the rotation shaft 633 may be provided to be matched.

As the driving motor assembly portion 634 which protrudes from one side of the driving arm 630 and the rotation protrusion 632 which protrudes from the other side of the driving arm 630 are respectively supported by the housing 620 and the auxiliary housing (not shown), the driving arm 630 may rotate about the rotation shaft 633.

The driving arm 630 may rotate downward of the robot cleaner 1 in the direction of the gravity. The driving arm 630 may rotate downward of the robot cleaner 1 until a lower side surface 636 of the driving arm 630 is in contact with the driving arm support portion 530 provided at a lower side of the lower housing 500.

As described above, the driving wheel 610 may protrude downward from the robot cleaner 1 in conjunction with the rotational displacement of the driving arm 630.

As illustrated in FIG. 7, the driving unit 600 may include an elastic member 640 supported between a support protrusion 635 which extends from one side of the driving arm 630 and a support hook 625 positioned at the housing 620.

The elastic member 640 may serve to improve a traction force of the driving wheel 610 by continuously pressing the driving wheel 610.

One side of the elastic member 640 may be supported by the support protrusion 635 moved in conjunction with rotation of the driving arm 630, and the other side of the elastic member 640 may be supported by the support hook 625 which is provided in the housing 620 and has a constant displacement value when the driving arm 630 rotates.

As a displacement of the support protrusion 635 changes, the length of the elastic member 640 changes in conjunction with rotation of the driving arm 630, so that an elastic force of the elastic member 640 may change.

The housing 620 may include a housing assembly portion 622 which extends from one side of a lower end to an outside of a side surface of the lower housing 500 so as to be seated on the lower housing 500 and be assembled.

The housing assembly portion 622 may include a hollow to be coupled by a screw which passes through the lower housing 500 and the hollow or may be coupled by a protrusion (not shown) which extends upward from the lower housing 500 to correspond to the hollow of the housing assembly portion 622.

The housing assembly portion 622 may be provided in a plural number unlike the embodiment of the present disclosure. A single or the plurality of housing assembly portions 622 may be provided at the outside of a rotation radius of the support protrusion 635 so as not to interfere with rotation of the support protrusion 635 when provided adjacent to the support protrusion 635.

The traction force of the driving wheel 610 is not constant due to change in an elastic force of the elastic member 640, and this will be described below.

Figure 9:
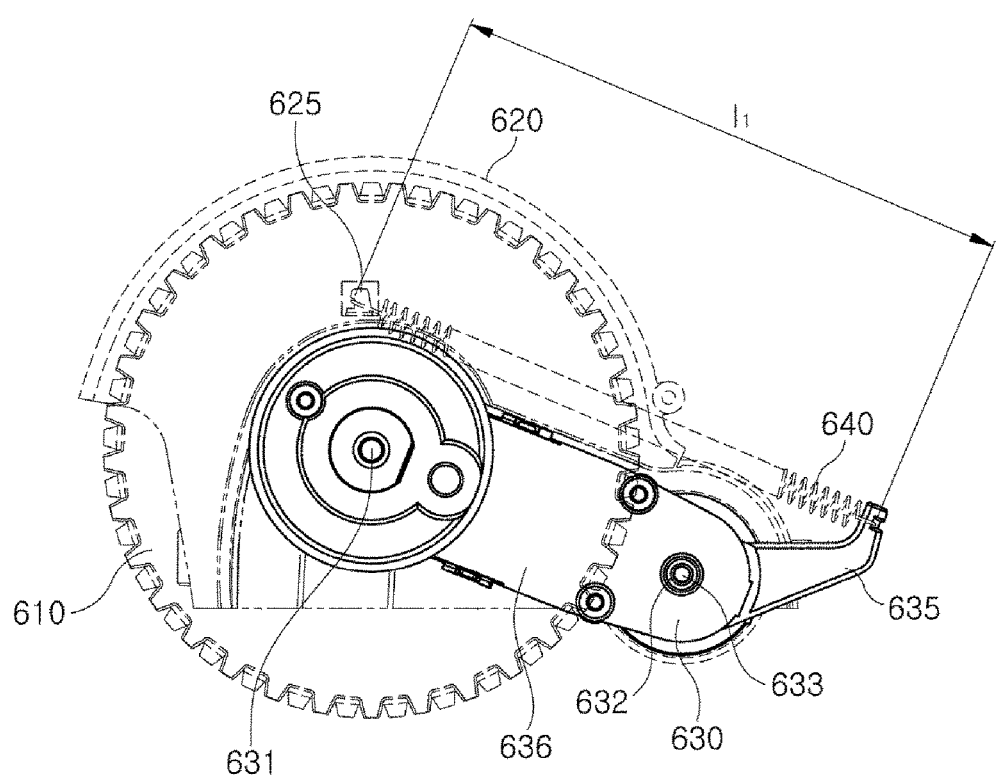
FIG. 9 is a view illustrating a side surface of a part of the configuration of the driving unit according to the embodiment of the present disclosure.
Figure 10:
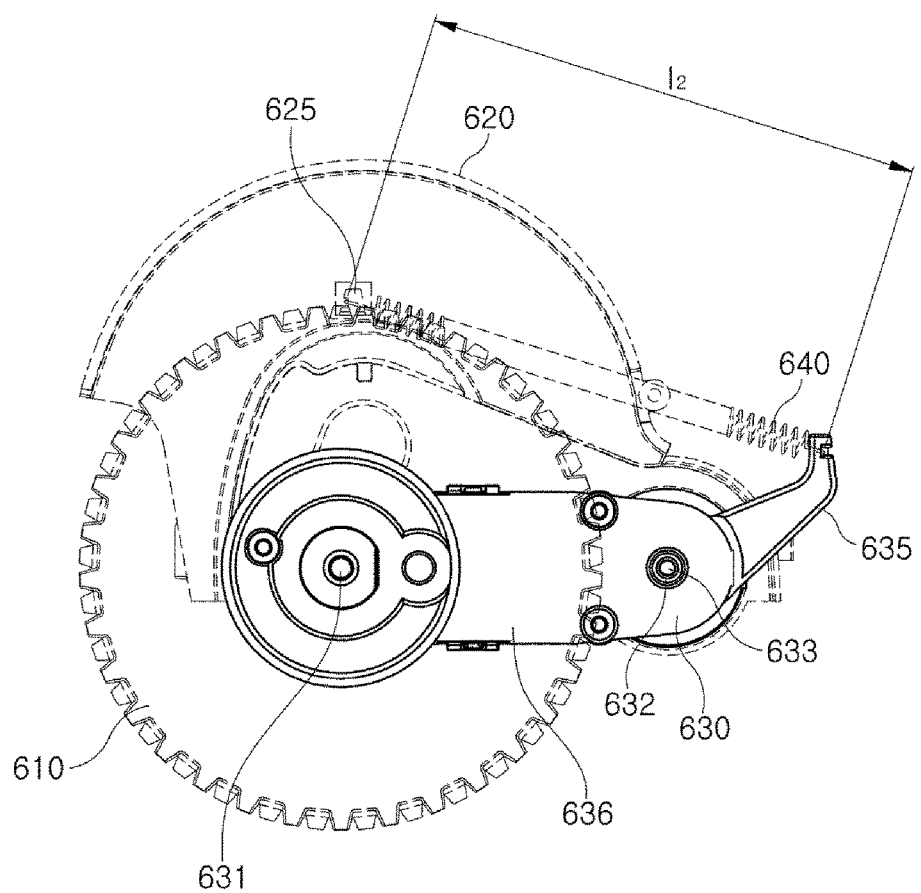
FIG. 10 is a view illustrating a side surface of the driving unit when a driving wheel of the driving unit according to the embodiment of the present disclosure protrudes downward.
Figure 11:
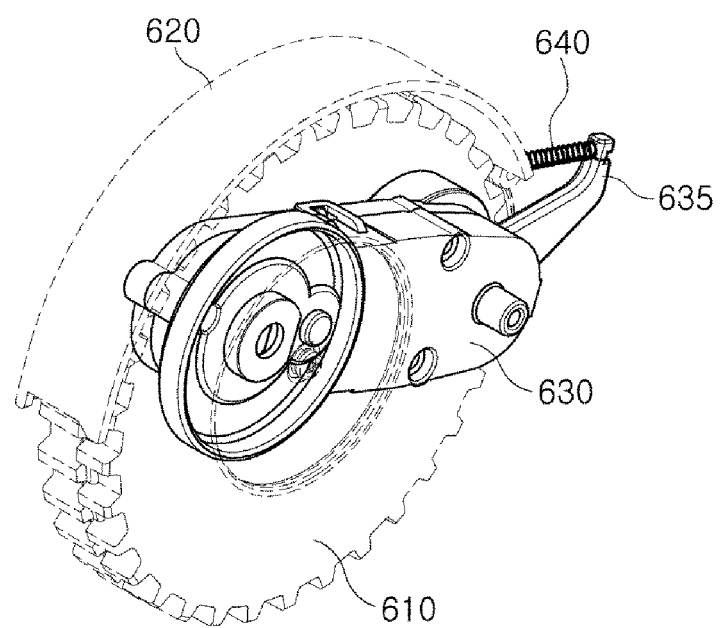
FIG. 11 is a perspective view illustrating a part of the configuration of the driving unit according to the embodiment of the present disclosure.
Figure 12:
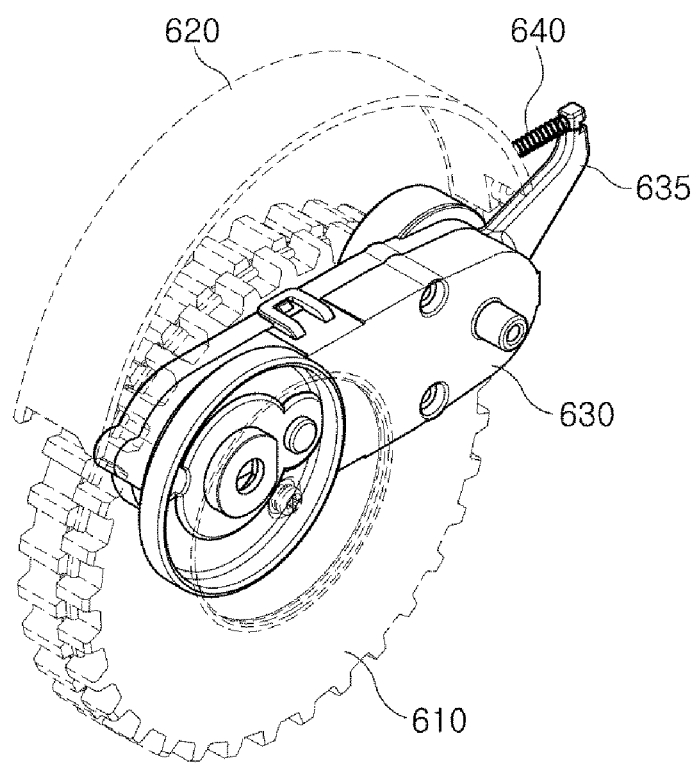
FIG. 12 is a perspective view illustrating a part of the configuration of the driving unit when the driving wheel of the driving unit according to the embodiment of the present disclosure protrudes downward.

FIG. 9 is a view illustrating a side surface of the part of the configuration of the driving unit according to the embodiment of the present disclosure, FIG. 10 is a view illustrating a side surface of the driving unit when a driving wheel of the driving unit according to the embodiment of the present disclosure protrudes downward, FIG. 11 is a perspective view illustrating a part of the configuration of the driving unit according to the embodiment of the present disclosure, and FIG. 12 is a perspective view illustrating a part of the configuration of the driving unit when the driving wheel of the driving unit according to the embodiment of the present disclosure protrudes downward. For the sake of convenience in the description, the driving wheel 610 and the housing 620 are displayed as dotted lines in the drawings.

FIGS. 9 and 11 are views illustrating the driving unit 600 when the driving wheel 610 does not protrude. The driving wheel 610 may be inserted into the housing 620 to be adjacent to an inside of the housing and may be pressed by the elastic member 640.

FIGS. 10 and 12 are views illustrating the driving unit 600 when the driving wheel 610 protrudes downward from the robot cleaner 1.

Since the driving arm 630 rotates about the rotation shaft 633, a driving wheel assembly portion 631 disposed on the left of the rotation shaft 633 with respect to a side surface of the driving unit 600 and the driving wheel 610 supported by the driving wheel assembly portion 631 may move downward from the robot cleaner 1.

Specifically, since the driving arm 630 rotates in the direction of gravity, the driving arm 630 rotates in the counterclockwise direction. Accordingly, the driving wheel 610 provided at the left of the rotation shaft 633 may move downward from the robot cleaner 1, and, on the contrary, the support protrusion 635 provided at the right of the rotation shaft 633 and one side of the elastic member 640 supported by one side of the support protrusion 635 may move upward in the robot cleaner 1.

Comparing FIGS. 9 and 10, a length $l_1$ of the elastic member before the driving wheel 610 protrudes may be greater than a length $l_2$ of the elastic member when the driving wheel 610 protrudes.

This is because one side of the elastic member 640 supported by the support protrusion 635 is raised by rotation of the driving arm 630, a distance from the other side of the elastic member 640 supported by the support hook 625 decreases, and thus the length l1 of the elastic member 640 decreases.

Hereinafter, a traction force f of the driving wheel 610 and the support protrusion 635 related to the traction force f will be described in detail.

Figure 13:
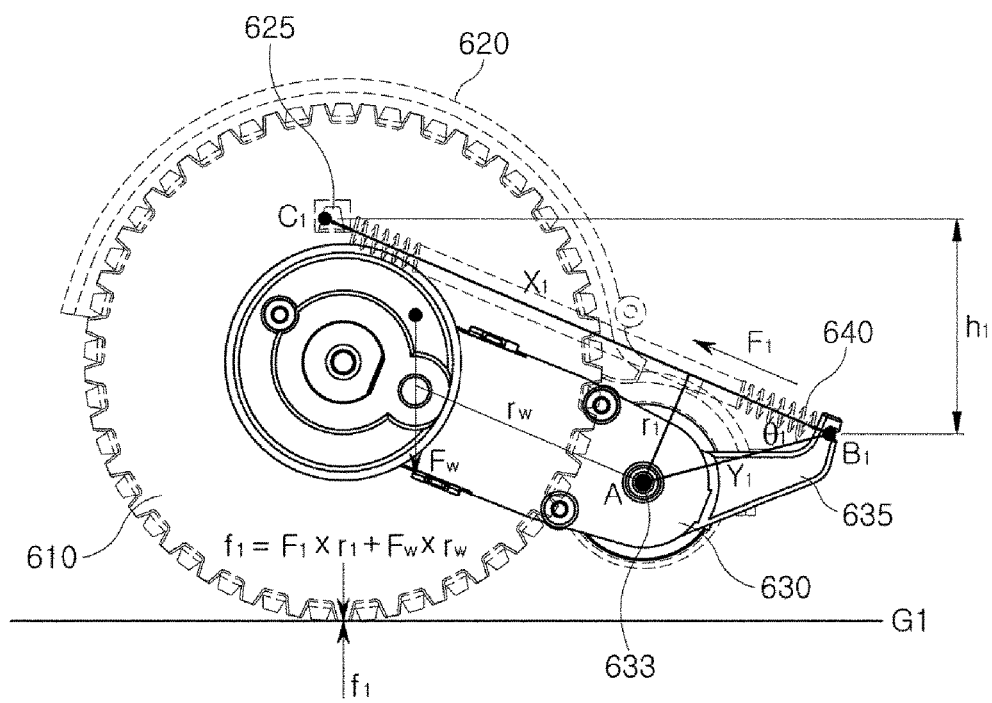
FIG. 13 is a schematic view illustrating a configuration related to a traction force of the driving unit according to the embodiment of the present disclosure.
Figure 14:
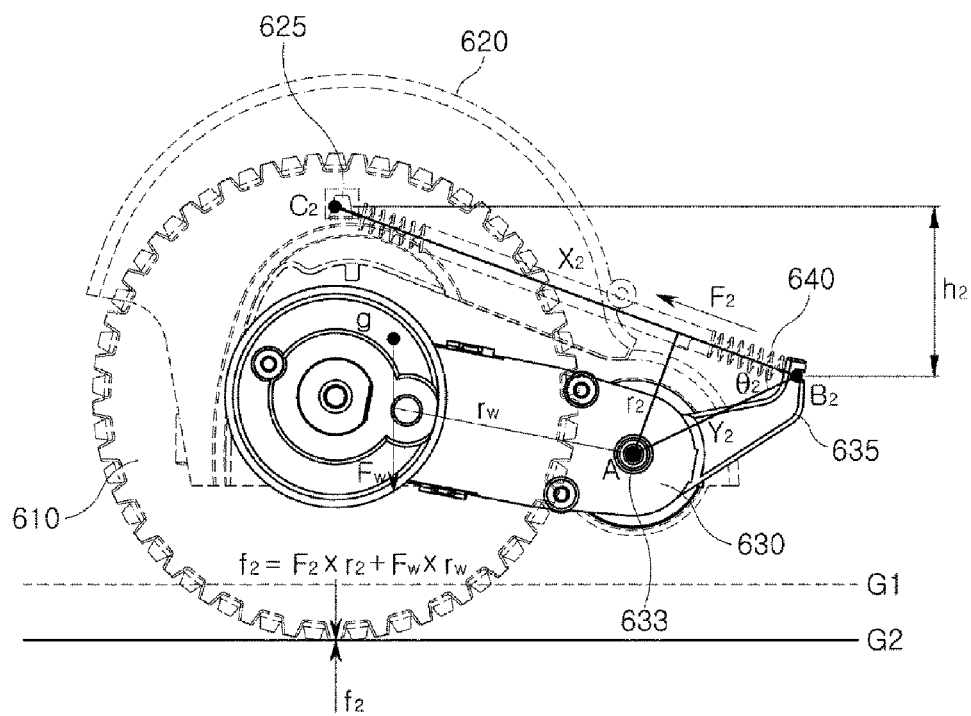
FIG. 14 is a schematic view illustrating the configuration related to the traction force of the driving unit when the driving wheel of the driving unit according to the embodiment of the present disclosure partially protrudes downward.
Figure 15:
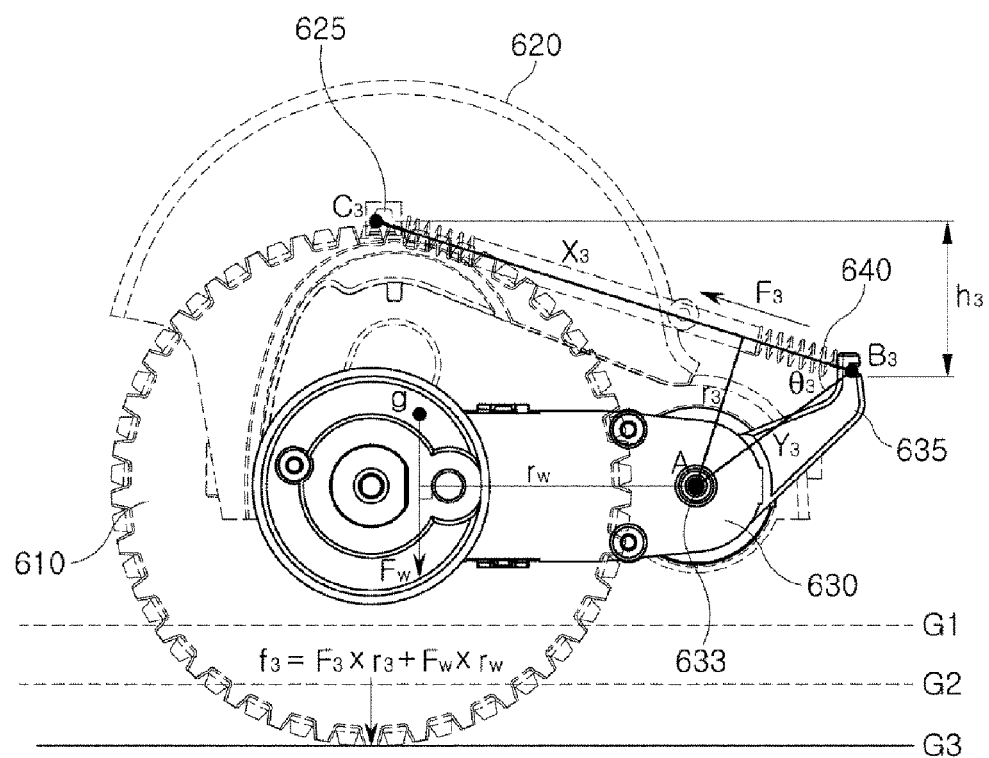
FIG. 15 is a schematic view illustrating a configuration related to the traction force of the driving unit when the driving wheel of the driving unit according to the embodiment of the present disclosure completely protrudes downward.

FIG. 13 is a schematic view illustrating a configuration related to a traction force of the driving unit according to the embodiment of the present disclosure, FIG. 14 is a schematic view illustrating the configuration related to the traction force of the driving unit when the driving wheel of the driving unit according to the embodiment of the present disclosure partially protrudes downward, and FIG. 15 is a schematic view illustrating a configuration related to the traction force of the driving unit when the driving wheel of the driving unit according to the embodiment of the present disclosure completely protrudes downward.

As describe above, a traction force f of the driving wheel 610 has to be constant so that the robot cleaner 1 drives stably.

The traction force f is a force pressed toward the surface. Schematically, the traction force f may be the sum of a torque value obtained as a gravitational acceleration value $F_w$ of the mass of the driving wheel 610 according to the mass of the driving wheel 610 times a perpendicular distance $r_w$ between a direction of the gravitational acceleration value $F_w$ and a rotation point A positioned at the rotation shaft 633 which is a reference point about which the driving wheel 610 moves downward, and a torque value obtained as an elastic force F of the elastic member 640 which presses the driving wheel 610 times a perpendicular distance r (hereinafter, referred to as a second straight line) between a direction of the elastic force F and the rotation point A.

The traction force f may be represented as $f=(F_w*r_w)+(F*r)$.

The torque value of gravitational acceleration due to the mass of the driving wheel 610 ($F_w*r_w$) is constant.

The mass of the driving wheel 610 is constant and as the driving wheel 610 protrudes, a displacement value of the driving arm 630 in contact with the driving wheel 610 changes, so that the center of gravity g of the entire driving wheel 610 may change, however, the change is very small.

That is, the traction force f may be changed according to the value ($F*r$).

As illustrated in FIGS. 13 to 15, the length of the elastic member 640 changes as the driving wheel 610 protrudes, the elastic force F of the elastic member 640 may change, and thus the torque value ($F*r$) according to the elastic force F may be changed and the total traction force f of the driving wheel 610 may be changed.

Specifically, when there is a first straight line X which connects a first support point B which supports one side of the elastic member 640 and is provided on the driving arm 630 to a second support point C which supports the other side of the elastic member 640 and is provided on the housing 620, and corresponds to the length of the elastic member, the length of the first straight line X may decrease when the driving wheel 610 moves downward.

As the driving arm 630 rotates in the counterclockwise direction, the driving wheel 610 positioned at the left of the rotation point A is lowered and the first support point B positioned at the right of the rotation point A of the driving arm 630 is raised, and thus a height difference h between the first support point B and the second support point C decreases and the length of the first straight line X also decreases in conjunction therewith.

If the driving wheel 610 protrudes downward from the robot cleaner 1, the elastic force F might decreases and thus the total traction force f might decrease. However, since the second straight line r increase when the driving wheel 610 protrude downward from the robot cleaner 1, a change amount of the total torque value of the elastic force F may be maintained in a constant level Accordingly, the traction force f of the driving wheel 610 is prevented from being rapidly decreased when the length of the second straight line r increases while the driving wheel 610 is protruding downward from the robot cleaner 1.

When a third straight line Y connects the rotation point A to the first support point B, and θ indicates an angle formed between the first straight line X and the third straight line Y at the first support point B, the second straight line r may have a value $r=Y*\sin\theta$.

The second support point C is positioned at the housing 620, the first support point B is positioned at the rotatably provided driving arm 630, the rotation point A is positioned at a rotation shaft of the driving arm 630, and there is no change in the displacement value of the rotation point A and the second support point C while the driving wheel 610 is protruding, and thus the value of θ may be changed according to movement of the first support point B.

While the driving wheel 610 is protruding downward, the first support point B rotates about the rotation point A in the counterclockwise direction, approaches the second support point C, and thus the value of θ may be increased in conjunction therewith.

While the driving arm 630 is rotating, when the value of θ is maintained in a range from 0° to 90°, that is, an acute angle, a value of sin θ may continually increase while the driving wheel 610 is protruding downward.

Accordingly, while the driving wheel 610 is being lowered, the elastic force F of the elastic member 640 may decrease, on the contrary, in a range in which the value of θ maintains an acute angle, the value of sin θ may increase and thus the traction force f may be maintained to be a substantially constant level.

Therefore, according to the present disclosure directed to improve the traction force f when the driving wheel 610 protrudes, the first support point B and the second support point C may be provided to have the value of θ in an acute angle while the driving wheel 610 is protruding.

Specifically, while the value of θ is maintained as an acute angle, as illustrated in FIG. 13, a value of $\theta_1$ formed when the driving wheel 610 does not protrude may be less than a value of $\theta_2$ formed when the driving wheel 610 protrudes downward from the robot cleaner 1 and a value of θ3 formed when the driving wheel 610 finishes protruding.

This is for increasing the value of sin θ while the driving wheel 610 is protruding to offset a decrease in the elastic force $F_1$ due to a length of the first straight line $X_1$ when the driving wheel 610 does not protrude being less than lengths of the first straight lines $X_2$, $X_3$ while the driving wheel 610 is respectively protruding downward and finishes protruding.

In addition, when the driving wheel 610 finishes protruding, the length $X_3$ of the first straight line becomes a minimum, and thus the elastic force $F_3$ value becomes a minimum. To offset this, the value of $\theta_3$ may be provided to be greater than the values of $\theta_1$ and $\theta_2$ when the driving wheel 610 finishes protruding.

As describe above, since the value of $\theta_3$ is provided to be the acute angle, the maximum value of $\theta_3$ may be 90°.

Accordingly, while the driving wheel 610 is moving downward, the value of θ may be provided to be an acute angle satisfying $\theta_1<\theta_2<\theta_3$ always. The value of $\theta_1$ may be preferably provided to be less than 50°.

The value of $\theta_1$ may be adjusted through an extension length and an angle of the support protrusion 635. However, a suitable value of $\theta_1$ may be set according to a volume of the lower housing 500 in which the driving unit 600 is seated.

With respect to the second straight line r, since an entire torque value ($F*r$) increases according to the increase in the r value, the length of the second straight line r may be provided to be increased while the driving wheel 610 is moving downward.

Accordingly, the second straight line may have the length r satisfying $r_1<r_2<r_3$ always.

While the driving wheel 610 is protruding, the second support point C may always be positioned higher than the first support point B. This is because, if the second support point C positioned lower than the first support point B while the driving wheel 610 is protruding, the length $r_3$ of the second straight line when the driving wheel 610 finishes protruding might be less than the length $r_2$ of the second straight line in the middle of the protruding of the driving wheel 610.

Similarly, while the driving wheel 610 is protruding, the first support point B may be always provided above the rotation point A.

One side of the elastic member 640 may be supported by the support protrusion 635, and the other side thereof may be supported by the support hook 625. Accordingly, the first support point B may be positioned on the support protrusion 635, and the second support point C may be positioned on the support hook 625.

Specifically, the support protrusion 635 may be provided to extend in a direction opposite the driving wheel assembly groove 631 with respect to the rotation shaft A. In addition, the support protrusion 635 may be provided with a groove in a hook shape to support one side of the elastic member 640.

One side of the elastic member 640 may be assembled into the groove in a hook shape and supported by the support protrusion 635, and the first support point B may be provided at a side of the groove in a hook shape in contact with the elastic member 640.

Since the value of θ and the length r of the second straight line are defined by the first support point B, the first support point B may be provided to be positioned in a range in which the support protrusion 635 maintains the value of θ at an acute angle and simultaneously increases while the driving wheel 610 is protruding.

Since the support protrusion 635 receives a tensile force from the elastic member 640 due to an elastic force, a predetermined magnitude of hardness may be needed. Accordingly, the support protrusion 635 may be provided to have a certain thickness to maintain the predetermined magnitude of hardness. The thickness of the support protrusion 635 may be changed to correspond to the elastic force of the elastic member 640.

To miniaturize the robot cleaner 1, the sizes of the upper and lower housings 100 and 500 except a dust collecting portion of the robot cleaner 1 decrease and a gap between elements seated on the lower housing 500 may be narrow.

At this time, when the thickness becomes thick to maintain the hardness of the support protrusion 635, the section in which the support protrusion 635 rotates is limited due to the narrow space.

Accordingly, without being limited to the embodiment of the present disclosure, the support protrusion 635 may be formed of a steel member capable of maintaining a significant hardness with a small thickness so that the support protrusion 635 is provided in the narrow space.

That is, the support protrusion 635 may be formed with a separate steel member without being integrally formed with the driving arm 630, and may be coupled to the driving arm 630.

When the support protrusion 635 is formed with the steel member, the thickness of the support protrusion 635 may decrease and the support protrusion 635 may be rotatably provided in conjunction with the driving arm 630 without being interfered with by elements provided to be pressed against the lower housing 500.

An assembly portion (not shown) in which the support protrusion 635 is assembled is provided at one side of the driving arm 630 to fix the support protrusion 635 and the support protrusion 635 may be supported by being coupled by a screw member (not shown).

The support hook 625 may be provided to protrusively extend from the housing 620 toward one side. The groove in a hook shape may be provided at support hook 625 to support the other side of the elastic member 640. The other side of the elastic member 640 may be assembled into the groove in the hook shape and supported by the support hook 625, and the second support point B may be provided at the groove in the hook shape in contact with the elastic member 640.

The support hook 625 may be provided at the housing 620 and support the elastic member 640 without a position movement while the driving arm 630 is pivoting, unlike the support protrusion 635.

As is apparent from the above description, a driving unit and a robot cleaner having the same can complement an elastic force of an elastic member changed according to the displacement of a driving wheel by improving a support point of the elastic member so that the improved robot cleaner can be continuously and stably driven on a floor surface having steps, thereby improving efficiency of the robot cleaner.

While specific embodiments of the present disclosure have been illustrated and described above, the disclosure is not limited to the aforementioned embodiments. Those skilled in the art may variously modify the disclosure without departing from the gist of the disclosure claimed by the appended claims.

What is claimed is:
1. A robot cleaner comprising:
a main body; and
a driving unit including:
   a driving wheel to drive the main body;
   a housing;
   a driving motor which generates a rotational force for driving the driving wheel to drive the main body;
   a driving arm which rotates about a rotation point so that the driving wheel is supported to protrude downward from the main body; and
   an elastic member supported between a first support point provided at one side of the driving arm and a second support point provided at the housing,
      wherein an angle (θ) formed between a line passing through the first support point and the rotation point and a line passing through the second support point and the first support point is maintained at an acute angle while the driving arm is rotating.

2. The robot cleaner of claim 1, wherein:
the driving arm rotates about the rotation point in between a first position and a second position in which the driving wheel protrudes toward the outside of the main body; and
when the angle formed when the driving arm is positioned at the first position is referred to as a first angle, and the angle formed when the driving arm is positioned at the second position is referred to as a second angle, and the first angle is less than the second angle.

3. The robot cleaner of claim 2, wherein the first angle is 50° or less.

4. The robot cleaner of claim 2, wherein the second angle is 90° or less.

5. The robot cleaner of claim 1, wherein the driving arm includes a support protrusion which extends from the driving arm to protrude toward an outside of the housing and includes the first support point.

6. The robot cleaner of claim 5, wherein the support protrusion supports one side of the elastic member and changes a displacement of the elastic member in conjunction with the rotation of the driving arm.

7. The robot cleaner of claim 1, wherein:
the housing includes a support hook having the second support point; and
the support hook supports one side of the elastic member.

8. The robot cleaner of claim 1, wherein:
the driving wheel has a traction force generated due to a frictional force with a surface when driving; and
the traction force of the driving wheel is maintained at a constant level while the driving wheel protrudes toward the outside of the main body and the driving wheel is seated inside the main body.

9. The robot cleaner of claim 1, wherein the second support point is always positioned above the first support point or is positioned on at least the same horizontal line.

10. The robot cleaner of claim 9, wherein a height of a position at which the first support point is positioned is raised as the driving wheel is moving downward from the main body.

11. The robot cleaner of claim 9, wherein the first support point is positioned above the rotation point.

12. A robot cleaner comprising:
a main body; and
a driving unit including:
  a driving wheel to drive the main body:
  a driving motor which generates a rotational force for driving the driving wheel to drive the main body;
  a driving arm which rotates about a rotation point so that the driving wheel is supported to protrude downward from the main body; and
  an elastic member supported between a first support point which is provided at one side of the driving arm and moves in conjunction with the driving arm and a second support point which is fixed, and wherein:
    with respect to a first straight line which connects the first support point to the second support point, and a second straight line which passes through the rotation point and intersects at a right angle with the first straight line,
      a length of the second straight line between the rotation point and an intersecting point with the first straight line is greater when the driving wheel protrudes downward from the main body than when the driving wheel is seated in the main body.

13. The robot cleaner of claim 12, wherein, the driving wheel rotates about the rotation point in between a first position and a second position in which the driving wheel protrudes toward an outside of the main body, and the length of the second straight line has a maximum value at the second position.

14. The robot cleaner of claim 12, wherein the length of the second straight line extends as the driving wheel is protruding downward from the main body.

15. The robot cleaner of claim 12, wherein:
the driving unit further includes a housing in which the driving wheel, the driving motor, and the driving arm are seated; and
the rotation point and the second support point are provided inside the housing.

16. The robot cleaner of claim 15, wherein the driving arm includes a support protrusion which extends from the driving arm to protrude toward an outside of the housing and includes the first support point.

17. The robot cleaner of claim 16, wherein the support protrusion supports one side of the elastic member and changes a displacement of the elastic member in conjunction with rotation of the driving arm.

18. The robot cleaner of claim 15, wherein:
the housing includes a support hook having the second support point; and
the support hook supports one side of the elastic member.

19. The robot cleaner of claim 12, wherein an angle formed between a line passing through the first support point and the rotation point and a line passing through the second support point and the rotation point is maintained at an acute angle while the driving arm is rotating.

20. The robot cleaner of claim 12, wherein:
the driving arm rotates about the rotation point in between a first position and a second position in which the driving arm protrudes toward the outside of the main body; and
when the angle formed when the driving arm is positioned at the first position is referred to as a first angle, and the angle formed when the driving arm is positioned at the second position is referred to as a second angle, and the first angle is less than the second angle.

21. A robot cleaner comprising:
a main body; and
a driving unit including:
  a driving wheel to drive the main body on a surface;
  a driving motor to generate a rotational force for driving the driving wheel to drive the main body;
  a driving arm coupled to the driving wheel and rotatable about a rotation point with respect to the main body to press the driving wheel to protrude downward from the main body, the driving arm including a first support point on a side of the driving arm;
  a housing including a second support point forming an angle ($\theta$) between a line passing through the first support point and the rotation point and a line passing through the second support point and the first support point, the angle being maintained as an acute angle while the driving arm is rotating; and
  an elastic member coupled to the first support point and the second support point to press the driving wheel against the surface using an elastic force of the elastic member according to the formed angle, thereby transferring the elastic force of the elastic member to the driving wheel to generate a traction force according to the formed angle.

* * * * *